United States Patent
Tabata et al.

[11] Patent Number: 5,847,469
[45] Date of Patent: Dec. 8, 1998

[54] HYBRID DRIVE SYSTEM WHEREIN ELECTRIC MOTOR OR ENGINE IS SELECTIVELY USED FOR REARWARD DRIVING OF VEHICLE

[75] Inventors: Atsushi Tabata, Okazaki; Yutaka Taga, Aichi-ken, both of Japan

[73] Assignee: Toyota Jidosha Kabushiki Kaisha, Toyota, Japan

[21] Appl. No.: 801,417

[22] Filed: Feb. 18, 1997

[30] Foreign Application Priority Data

Feb. 29, 1996 [JP] Japan .................................. 8-042841

[51] Int. Cl.$^6$ ........................................................ H02P 9/04
[52] U.S. Cl. .............................. 290/40 C; 290/9; 290/45; 322/16
[58] Field of Search ................................. 290/9, 10, 40 C, 290/45; 322/16, 14; 318/139, 153

[56] References Cited

U.S. PATENT DOCUMENTS

| | | | |
|---|---|---|---|
| 4,768,636 | 9/1988 | Ito et al. ......................................... | 192/8 |
| 5,056,614 | 10/1991 | Tokushima et al. ...................... | 180/248 |
| 5,529,546 | 6/1996 | Ishino et al. ................................ | 475/76 |
| 5,562,565 | 10/1996 | Moroto et al. ................................ | 477/3 |
| 5,696,680 | 12/1997 | Ichioka et al. .................... | 364/424.096 |
| 5,697,466 | 12/1997 | Moroto et al. ........................... | 180/65.2 |
| 5,704,440 | 1/1998 | Urban et al. ............................. | 180/65.2 |
| 5,735,770 | 4/1998 | Omote et al. ................................. | 477/5 |

FOREIGN PATENT DOCUMENTS

A-7-67208  3/1995  Japan .

*Primary Examiner*—Nestor Ramirez
*Assistant Examiner*—Nicholas Ponomarenko
*Attorney, Agent, or Firm*—Oliff & Berridge, PLC

[57] ABSTRACT

A hybrid vehicle drive system including an engine, an electric motor operated by an electric energy stored in a storage device, a power transmission having a rear-drive position, a shift lever for selecting the rear-drive position, a rear-drive shifting device for placing the power transmission in the rear-drive position when the shift lever is operated to a reverse position for selecting the rear-drive position, and a rear-drive mode control device which is operated when the shift lever is operated to the reverse position, for operating the electric motor to drive the vehicle in the rearward direction when the amount of the electric energy stored in the storage device is not smaller than a predetermined lower limit, and for operating the engine to drive the vehicle in the rearward direction when the stored electric energy amount is smaller than the lower limit.

14 Claims, 10 Drawing Sheets

FIG.5

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | C₀ | C₁ | C₂ | B₀ | B₁ | B₂ | B₃ | B₄ | F₀ | F₁ | F₂ | |
| NEUTRAL | N | ○ | | | | | | | | | | | — |
| REVERSE | Rev 1 | ○ | | ○ | | | | | ○ | | | | −4.550 |
| REVERSE | Rev 2 | ○ | | ○ | ○ | | | | ○ | | | | −3.431 |
| DRIVE | 1 st | ○ | ○ | | | | | | ● | ○ | | ○ | 3.357 |
| DRIVE | 2 nd | ● | ○ | | | ● | | | | ○ | | | 2.180 |
| DRIVE | 3 rd | ○ | ○ | | | | ○ | ○ | | ○ | | | 1.424 |
| DRIVE | 4 th | ○ | ○ | ○ | | | ○ | | | ○ | ○ | | 1.000 |
| DRIVE | 5 th | | ○ | ○ | ○ | | ○ | | | | | | 0.753 |

FIG. 7

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGE |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

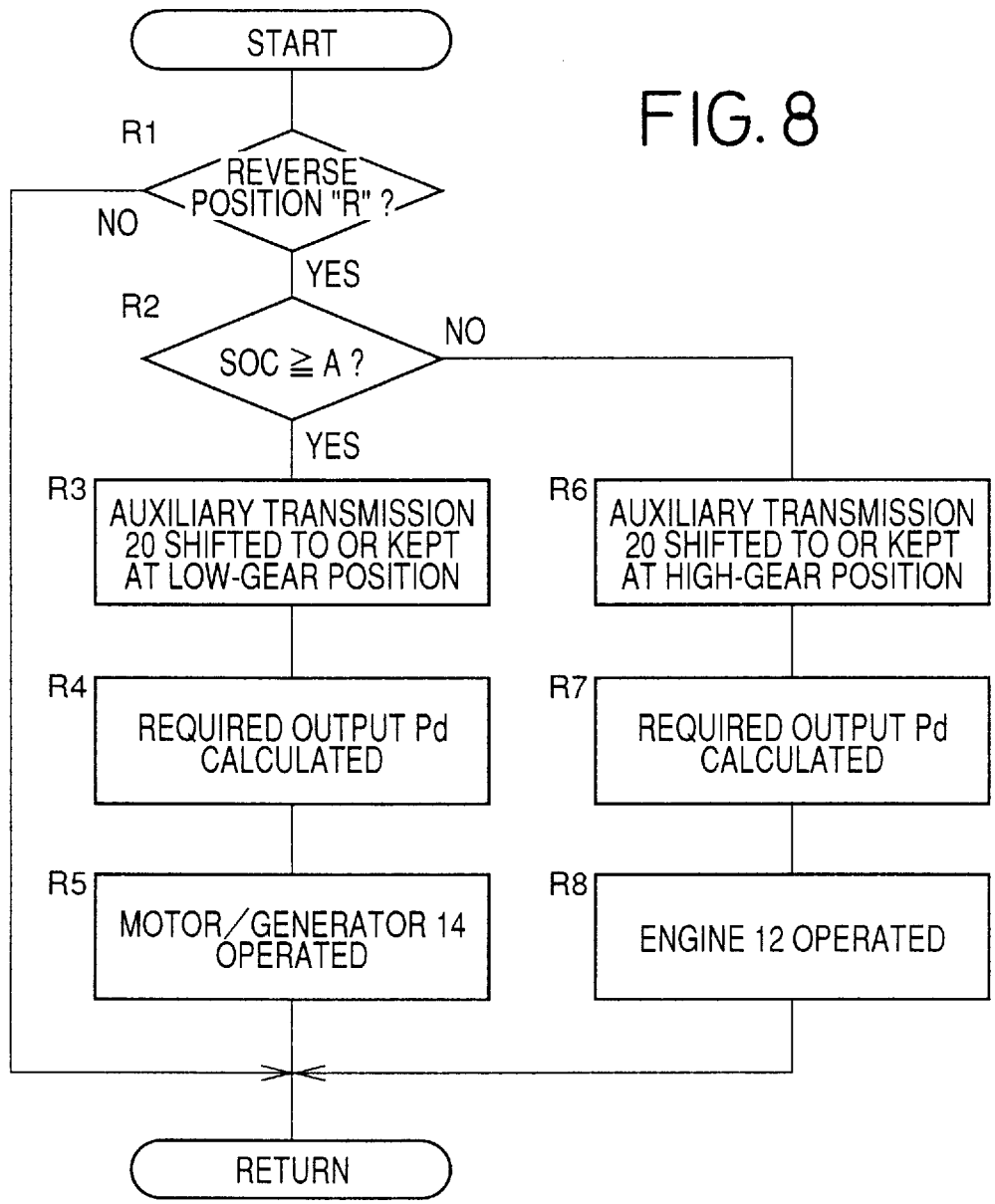

FIG. 10

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | ● | | | ● | | ○ | 3.357 |
| DRIVE | 2nd | ○ | | | | ○ | | | | 2.180 |
| DRIVE | 3rd | ○ | | | ○ | | | ○ | | 1.424 |
| DRIVE | 4th | ○ | ○ | | ○ | | | | | 1.000 |

# HYBRID DRIVE SYSTEM WHEREIN ELECTRIC MOTOR OR ENGINE IS SELECTIVELY USED FOR REARWARD DRIVING OF VEHICLE

This application is based on Japanese Patent Application No. 8-42841 filed Feb. 29, 1996, the content of which is incorporated hereinto by reference.

CROSS REFERENCE TO RELATED APPLICATIONS

U.S. patent application Ser. No. 08/746,483 filed Nov. 12, 1996

BACKGROUND OF THE INVENTION

Field of the Invention

The present invention relates in general to a hybrid drive system for driving a motor vehicle, and more particularly to techniques for controlling such a hybrid vehicle drive system during running of the vehicle in the rearward direction.

Discussion of the Related Art

Such a hybrid drive system for a motor vehicle includes (a) an engine operated by combustion of a fuel, (b) an electric energy storage device for storing an electric energy, (c) an electric motor operated by the electric energy stored in the electric energy storage device, and a power transmission device which is disposed in a power transmission path between drive wheels of the vehicle and a drive power source consisting of the engine and the electric motor. Such a hybrid drive system is disclosed in JP-A-7-67208. When the motor vehicle equipped with the hybrid drive system is driven in the rearward direction, the electric motor is generally operated in the reverse direction.

However, the known hybrid vehicle drive system as described above has some restrictions in the rearward running of the vehicle, since the operation of the electric motor is limited where the amount of electric energy stored in the electric energy storage device is reduced. Continued operation of the electric motor may result in reduced durability or life expectancy of the electric energy storage device. To drive the vehicle in the rearward direction by the engine rather than the electric motor, the power transmission device may be constructed to have a rear drive position. In this case, the control arrangement tends to be complicated, due to the requirement for switching the drive power source from the electric motor to the engine upon reduction of the electric energy amount stored in the storage device.

The motor vehicle may be driven in the rearward direction with the electric motor operated in the forward direction and with the power transmission device placed in the rear drive position. This arrangement facilitates the control to switch the drive power source from the electric motor to the engine. If the speed reduction ratio of the rear drive position is determined for the electric motor to provide a sufficient drive torque, the drive torque provided by the engine when operated to drive the vehicle in the rearward direction tends to be excessive even with the throttle valve being placed in the engine idling position (almost fully closed position), leading to difficult control of the vehicle for the rearward running.

SUMMARY OF THE INVENTION

It is therefore a first object of the present invention to provide a hybrid drive system for a motor vehicle, which permits easy switching of the drive power source from the electric motor to the engine for rearward driving of the vehicle, upon reduction of the electric energy amount stored in the electric energy storage device, It is a second object of the invention to provide a hybrid drive system which permits easy control of the vehicle even when the drive power source for the rearward running is switched from the electric motor to the engine.

The first object may be achieved according to the principle of the present invention, which provides a hybrid drive system for a motor vehicle having a drive wheel, comprising: (a) an engine operated by combustion of a fuel; (b) an electric energy storage device for storing an electric energy; (c) an electric motor operated with the electric energy stored in the electric energy storage device; (d) a power transmission device having at least one forward-drive position for driving the motor vehicle in a forward direction and at least one rear-drive position for driving the motor vehicle in a rearward direction, and disposed in a power transmission path between the drive wheel and a drive power source consisting of the engine and the electric motor; (e) manually operated selecting means for selecting the at least one rear-drive position of the power transmission device; (f) rear-drive shifting means for placing the power transmission device in one of the at least one rear-drive position when the manually operated selecting means is operated to a reverse position for selecting the at least one rear-drive position; (g) energy determining means for determining whether an amount of the electric energy stored in the electric energy storage device is smaller than a predetermined lower limit; and (h) rear-drive mode control means, operable when the manually operated selecting means is operated to the reverse position, for operating the electric motor to drive the motor vehicle in the rearward direction if the amount of the electric energy stored in the electric energy storage device is not smaller than the lower limit, and for operating the engine to drive the motor vehicle in the rearward direction if the amount of the electric energy stored in the storage device is smaller than the lower limit.

In the hybrid drive system of the present invention constructed as described above, the power transmission device is shifted to the rear-drive position when the manually operated selecting means is operated to the reverse position. In this arrangement, the operating direction of the electric motor for driving the motor vehicle in the rearward direction is the same as that for driving the vehicle in the forward direction. In other words, the present hybrid drive system eliminates the conventionally required operation of the electric motor in the reverse direction for driving the vehicle in the rearward direction, and makes it possible to simplify the control of the electric motor. Further, the drive power source for driving the vehicle in the rearward direction is switched from the electric motor to the engine when the amount of the electric energy stored in the storage device is reduced below the lower limit, so that the storage device is protected against excessive energy consumption and resulting deterioration of the life expectancy and charging and discharging efficiencies. The hybrid drive system satisfies the principle of the present invention even where the power transmission device has only one rear-drive position.

The second object indicated above may be achieved according to a first preferred form of this invention, wherein the power transmission device includes an automatic transmission having a first and a second rear-drive position as the at least one rear-drive position, the second rear-drive position having a higher speed ratio than the first rear-drive position, the automatic transmission comprising rear-drive switching hydraulic actuators for selectively establishing the first and second rear-drive positions, and wherein the rear-drive shifting means comprises: a solenoid-operated valve for controlling the rear-drive switching hydraulic actuators to selectively establish the first and second rear-drive positions of the automatic transmission; and shift control means for controlling the solenoid-operated valve so as to shift the automatic transmission to the first rear-drive position if the amount of the electric energy stored in the storage device is not smaller than the lower limit, and so as to shift the automatic transmission to the second rear-drive position if the amount of the electric energy stored in the storage device is smaller than the lower limit.

The second object may also be achieved according to a second preferred form of this invention, wherein the power transmission device includes an automatic transmission having a first and a second rear-drive position as the at least one rear-drive position, the second rear-drive position having a higher speed ratio than the first rear-drive position, the automatic transmission comprising rear-drive selecting hydraulic actuators and rear-drive switching hydraulic actuators for selectively establishing the first and second rear-drive positions, and wherein the rear-drive shifting means comprises: a manual shift valve mechanically connected to the manually operated selecting means means, for controlling the rear-drive selecting hydraulic actuators to establish the first and second rear-drive positions when the manually operated selecting means is operated to the reverse position; a solenoid-operated valve for controlling the rear-drive switching hydraulic actuators to selecting one of the first and second rear-drive positions of the automatic transmission; and shift control means for controlling the solenoid-operated valve so as to shift the automatic transmission to the first rear-drive position if the amount of the electric energy stored in the storage device is not smaller than the lower limit, and so as to shift the automatic transmission to the second rear-drive position if the amount of the electric energy stored in the storage device is smaller than the lower limit.

In the first and second preferred forms of the hybrid drive system of this invention, the power transmission device includes an automatic transmission having the first and second rear-drive positions having different speed rations. In this case, too, the rotating directions of the input and output shafts of the automatic transmission remain unchanged when the drive power source for rearward driving of the vehicle is changed from the electric motor to the engine. This arrangement assures easy, rapid and smooth switching of the drive power source from the electric motor to the engine, with substantially no changes in the rotating directions of various rotary elements of the automatic transmission.

In the first preferred form of the invention constructed as described above, the shift control means is adapted to control the solenoid-operated valve for controlling the rear-drive switching hydraulic actuators so as to shift the automatic transmission to the first or second rear-drive position, depending upon the amount of the electric energy stored in the electric energy storage device. That is, when the vehicle is driven in the rearward direction by the engine with the stored electric energy amount smaller than the lower limit, the automatic transmission is shifted to the second rear-drive position having the relatively high speed ratio. Accordingly, the drive torque in the engine drive mode is sufficiently reduced when the throttle valve is placed in a position close to the engine idling position. Therefore, the present form of the hybrid drive system assures comparatively easy control of the vehicle by the operator during the rearward running with the engine.

In the second preferred form of the hybrid drive system of the invention, the manual shift valve mechanically connected to the manually operated selecting means is adapted to control the rear-drive selecting hydraulic actuators for establishing the first or second rear-drive position of the automatic transmission, depending upon the operating states of the rear-drive switching hydraulic actuators. This arrangement permits the automatic transmission to be shifted to the appropriate first or second rear-drive position even in the event of electrical malfunctioning of the associated sensors and solenoid-operated valves.

BRIEF SUMMARY OF THE INVENTION

The above and other objects, features, advantages and technical and industrial significance of this invention will be better understood by reading the following detailed description of presently preferred embodiments of the invention, when considered in connection with the accompanying drawings, in which:

FIG. 5 is a view indicating operating states of various coupling elements for establishing different operating positions of the automatic transmission in the hybrid drive system of FIG. 1;

FIG. 7 is a view indicating nine operation modes which are selectively established in the sub-routine of FIG. 6;

FIG. 8 is a flow chart illustrating a rear-drive mode control routine executed by the control system of the hybrid drive system of FIG. 1 when the vehicle is driven in the rearward direction;

FIG. 10 is a view indicating operating states of coupling elements for establishing operating positions of the automatic transmission in the hybrid drive system of FIG. 9.

DETAILED DESCRIPTION OF THE PREFERRED EMBODIMENTS

Figure 1:
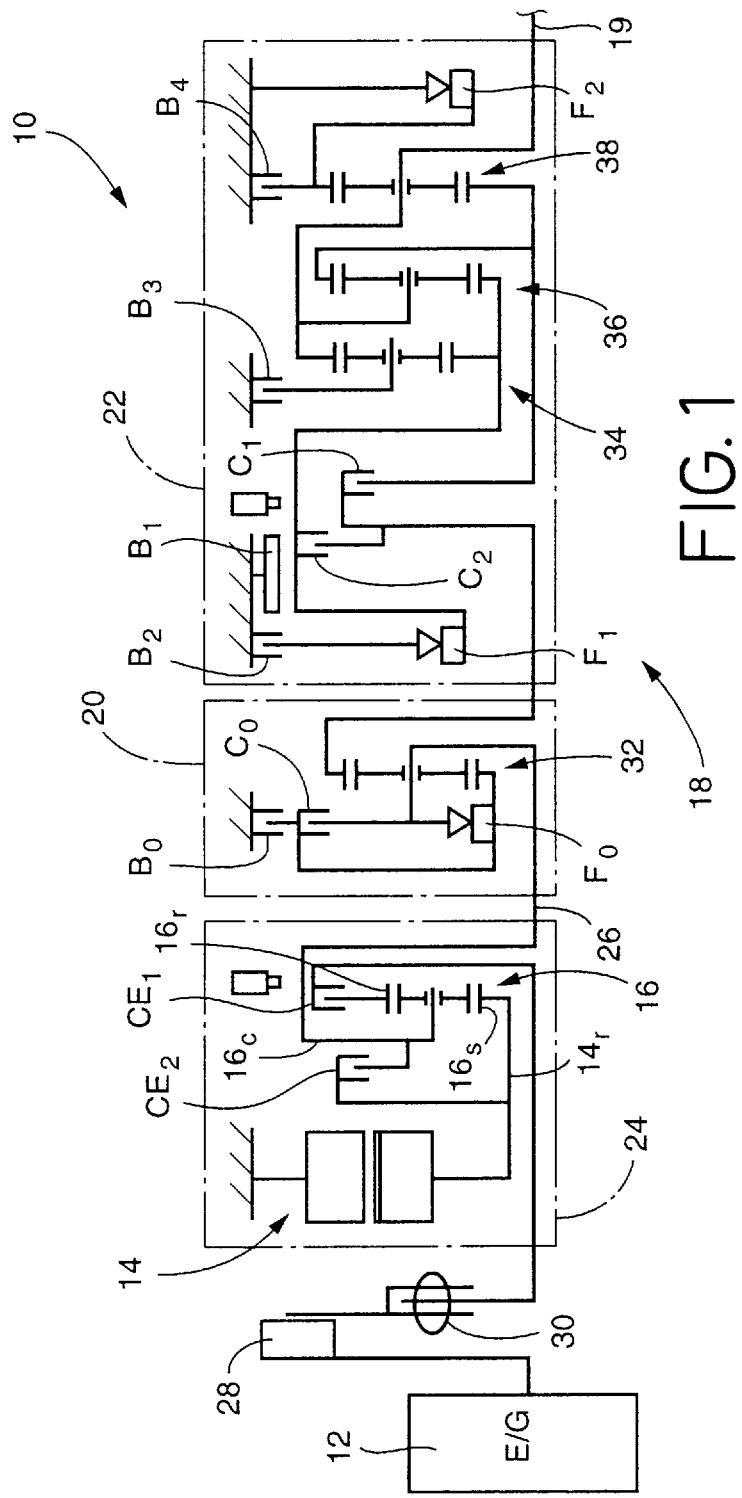
FIG. 1 is a schematic view illustrating a general arrangement of a hybrid drive system constructed according to one embodiment of the present invention.

Referring first to the schematic view of FIG. 1, there is shown a hybrid drive system 10 adapted for use on a front-engine rear-drive motor vehicle (F-R vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels. The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2. The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

Figure 4:
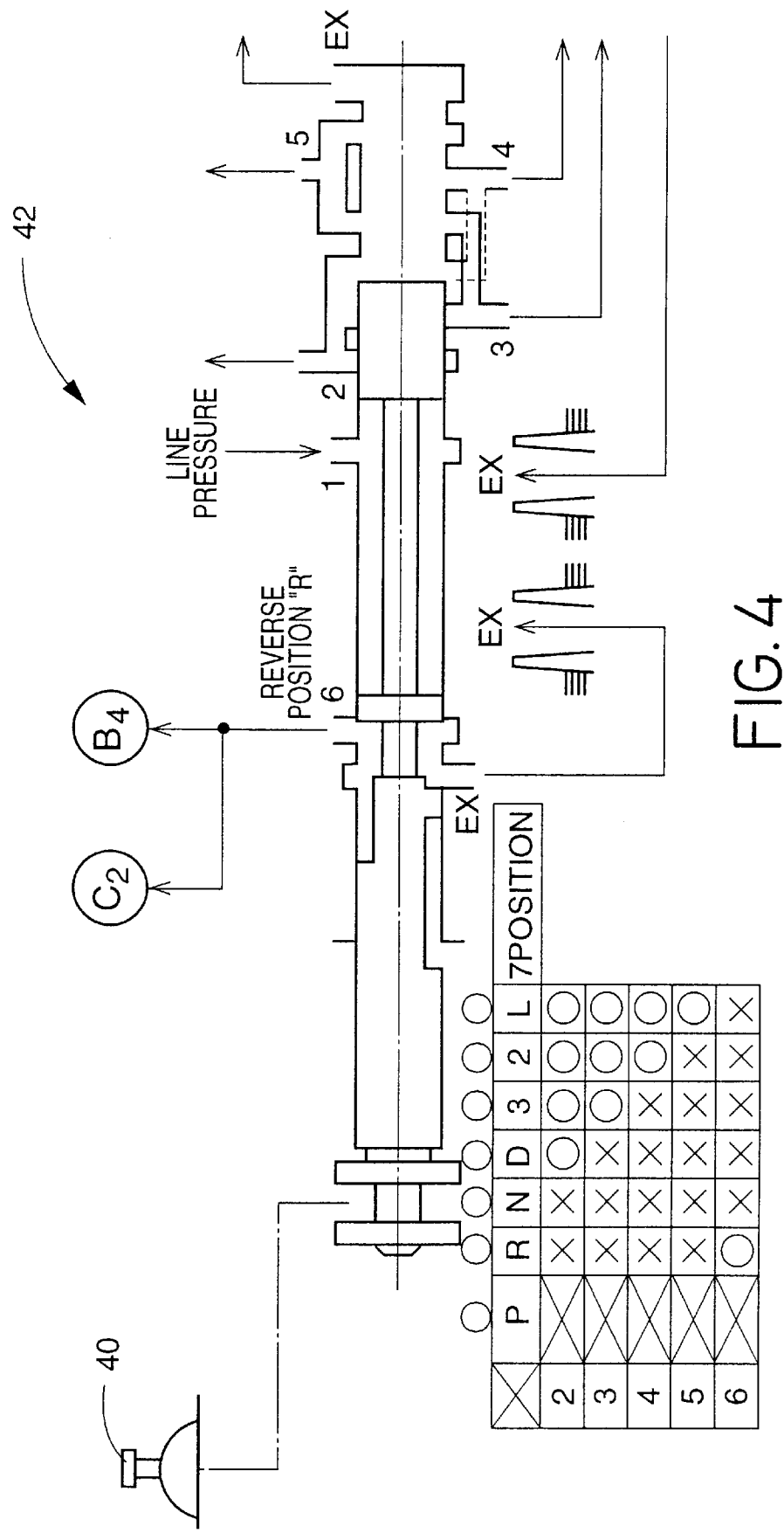
FIG. 4 is a view showing a manual shift valve provided in a hydraulic circuit for shifting an automatic transmission in the hybrid drive system of FIG. 1.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The auxiliary transmission 20 has a low-gear position (direct drive position) and a high-gear position. The primary transmission 22 has four forward-drive positions and one rear-drive position. The auxiliary transmission 20 includes frictionally coupling clutch C0 and brake B0 operated by respective hydraulic actuators, and a one-way clutch F0. The primary transmission 22 frictionally coupling clutches C1, C2 and brakes B1, B2, B3, B4 which are operated by respective hydraulic actuators, and one-way clutches F1, F2. The automatic transmission 18 includes a hydraulic circuit incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 5. The operating positions of the automatic transmission 18 consist of a neutral position "N", a first rear-drive position "Rev 1", a second rear-drive position "Rev 2", and five forward-drive positions, that is, first-speed position "1st", second-speed position "2nd", third-speed position "3rd", fourth-speed position "4th" and fifth-speed position "5th", as indicated in FIG. 5. The hydraulic circuit is connected to a manual shift valve 42 which is mechanically connected to and operated by a shift lever 40, as shown in FIG. 4. The shift lever 40, which functions as manually operated selecting means, has a neutral position "N", a reverse position "R", and drive position "D", as also indicated in FIG. 5. Further, the shift lever 40 has a parking position "P", a fourth-speed position "4", a third-speed position "3", a second-speed position "2" and a low-speed position "L", which are not shown in FIG. 5. Thus, the shift lever 40 has a total of eight operating positions. The third-speed, second-speed and low-speed positions "3", "2" and "L" are referred to as engine braking positions in which an engine brake may be applied to the vehicle.

In the table of FIG. 5, white circles indicate the engaged states of the clutches C, brakes B and one-way clutches F, while black circles indicate the engaged states of the clutch C0 and brakes B1, B4 when the shift lever 40 is shifted to any one of the engine braking positions. The absence of the white or black circles indicates the released states of the clutches C, brakes B and one-way clutches F. The neutral and rear-drive positions "N", "Rev 1" and "Rev 2" and the engine-braking positions of the automatic transmission 18 are established by the manual shift valve 42. When the shift lever 40 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle. While the shift lever 40 is placed in the reverse position, the automatic transmission 18 is selectively placed in the first rear-drive position "Rev 1" or second rear-drive position "Rev 2" by the solenoid-operated valve SL4. The speed ratios of the five forward-drive positions of the automatic transmission 18 decrease in steps from the speed ratio of the first-speed position "1st" to the speed ratio of the fifth-speed position "5th", as indicated in FIG. 5, by way of example only.

In the example of FIG. 5, the speed ratio i4 of the fourth-speed position "4th" is equal to 1. Where the planetary gear set 32 of the auxiliary transmission 20 has a gear ratio $\rho$ (which is smaller than zero and is equal to number Zs of teeth of the sun gear divided by number Zr of teeth of the ring gear), the speed ratio of the fifth-speed position "5th" is equal to $1/(1+\rho)$. Where the first rear-drive position "Rev 1" has a speed ratio ir1 (smaller than 1), the second rear-drive position "Rev 2" has a speed ratio ir2 which is equal to $ir1/(1+\rho)$. Where the planetary gear sets 36, 38 of the primary transmission 22 have gear ratios $\rho 2$ and $\rho 3$, respectively, the speed ratio ir1 is equal to $(1-1/\rho 2 \cdot \rho 3)$. In FIG. 1, the lower halves of the automatic transmission 18 and the electrically controlled torque converter 24 are not shown, since these devices 18, 24 are symmetrical with respect to their centerline.

The clutch C2 and brake B4 are engaged to establish the first and second rear-drive positions "Rev 1" and "Rev 2", with hydraulic pressure being applied from the manual shift valve 42 to the hydraulic actuators for the clutch C2 and brake B4 upon operation of the shift lever 40 to the reverse position "R". Thus, the hydraulic actuators for operating the clutch C2 and brake B4 function as rear-drive selecting hydraulic actuators for establishing the first and second rear-drive positions of the automatic transmission 18. The clutch C0 and brake B0 are selectively engaged and released by the solenoid-operated valve SL4 to select one of the rear-drive positions "Rev 1" and "Rev 2". Thus, the hydraulic actuators for operating the clutch C0 and brake B0 function as rear-drive switching hydraulic actuators for selecting one of the first and second rear-drive positions. The solenoid solenoid-operated valve SL4 is selectively energized or deenergized according to a control signal generated from an automatic transmission controller 52 shown in FIG. 2.

Figure 2:
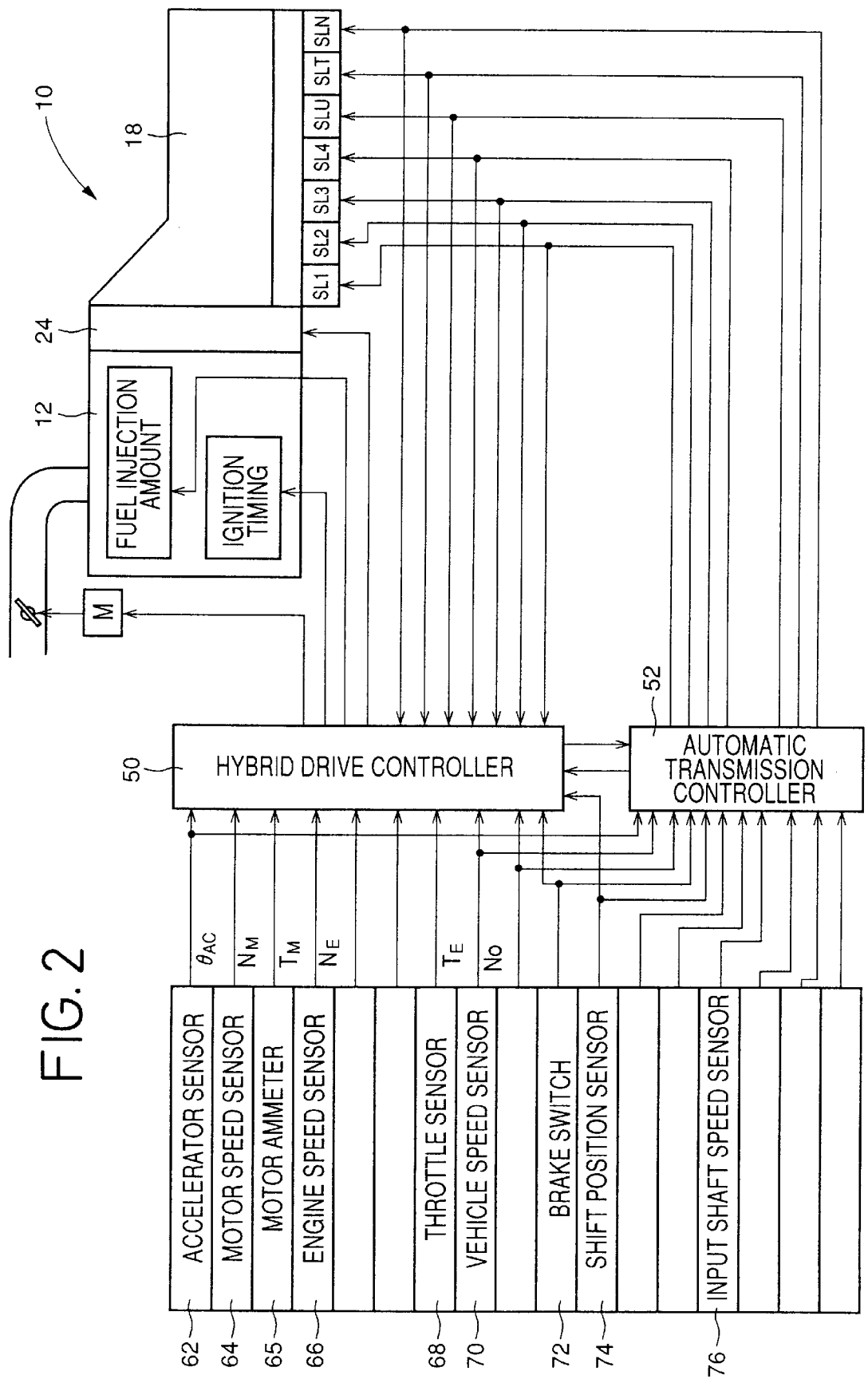
FIG. 2 is a view illustrating a control system used in the hybrid drive system of FIG. 1.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM).

The controllers 50, 52 receive output signals of various detectors or sensors which include: an accelerator sensor 62 for detecting an operating amount $\theta_{AC}$ of an accelerator pedal; a motor speed sensor 64 for detecting speed $N_M$ of the motor/generator 14; a motor ammeter 65 for detecting an electric current of the motor/generator 14, which indicates torque $T_M$ of the motor 14; an engine speed sensor 66 for detecting speed $N_E$ of the engine 12; a throttle sensor 68 for detecting the opening angle of a throttle valve, which indicates torque $T_E$ of the engine 12; a vehicle speed sensor 70 for detecting speed $N_O$ of the output shaft 19 of the automatic transmission 18, which indicates running speed V of the motor vehicle; a brake switch 72 for detecting an operation of a brake pedal; a shift position sensor 74 for detecting the currently selected position of the shift lever 40; and an input shaft speed sensor 76 for detecting speed $N_I$ of the input shaft 26 of the automatic transmission 18.

Figure 3:
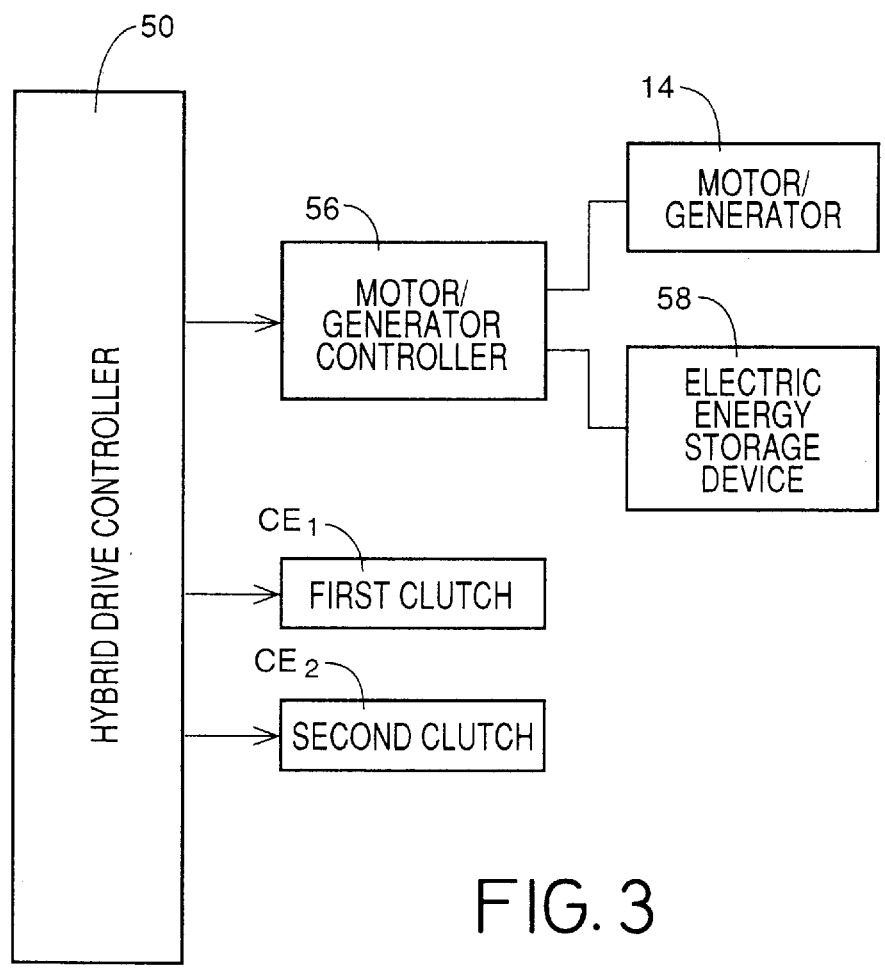
FIG. 3 is a block diagram showing connection between a hybrid drive controller shown in FIG. 2 and an electrically controlled torque converter.

The hybrid drive controller 50 is adapted to control the opening angle of the throttle valve, and the fuel injection and ignition timing of the engine 12, so that the output of the engine 12 is controlled depending upon the specific running condition of the vehicle. The motor/generator 14 is connected to an electric energy storage device 58 through a motor/generator controller 56, as indicated in FIG. 3. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 14 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The first and second clutches CE1, CE2 are controlled by the hybrid drive controllers 50 through solenoid-operated valves of the hydraulic circuit. The automatic transmission 18 is controlled by the automatic transmission controller 52 through the above-indicated solenoid-operated valves SL1–SL4, and linear solenoid valves SLU, SLT and SLN which are indicated in FIG. 2, so that the automatic transmission 18 is shifted to the optimum position depending upon the running condition of the vehicle.

Figure 6:
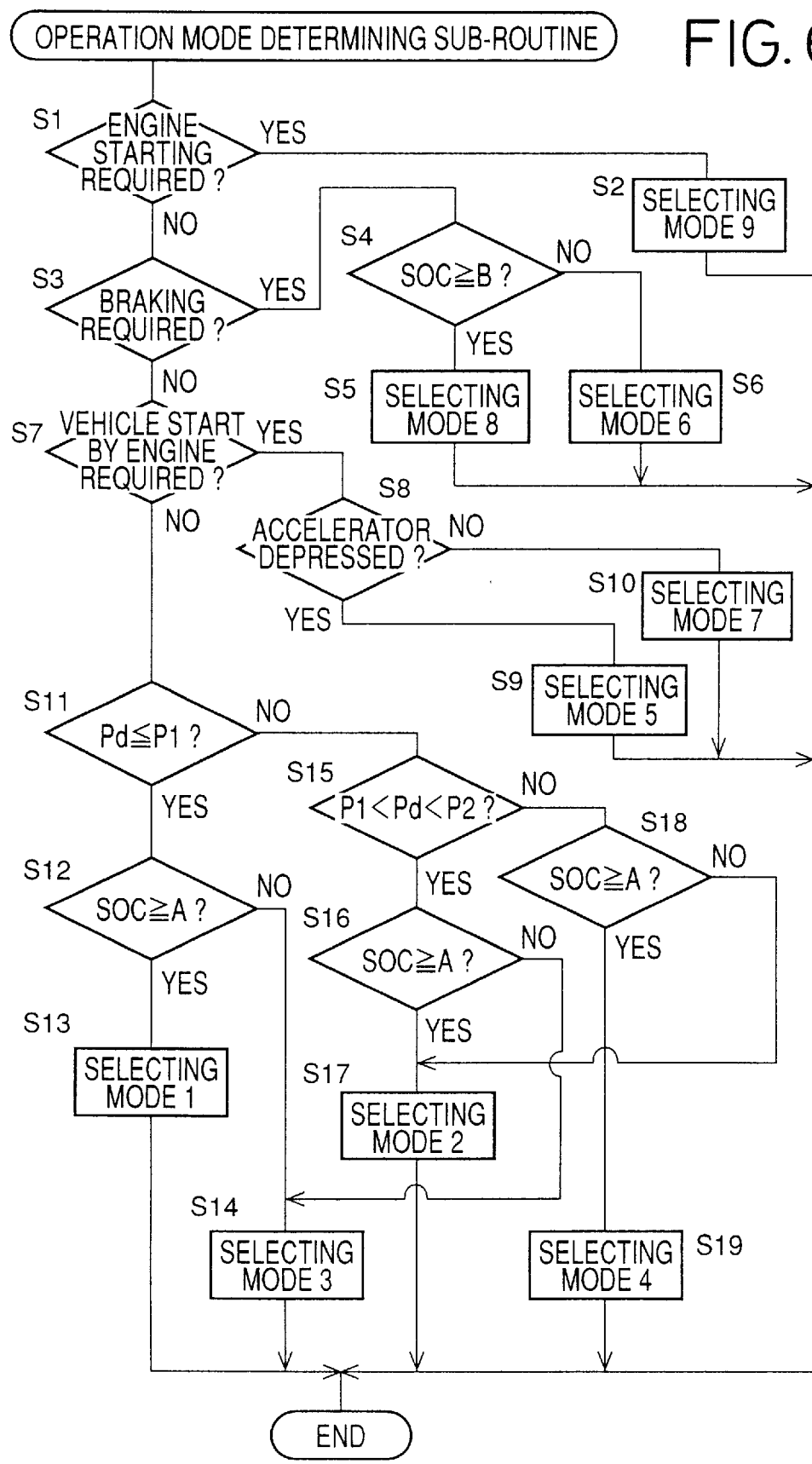
FIG. 6 is a flow chart illustrating an operation mode determining sub-routine executed by the control system of the hybrid drive system of FIG. 1.

The hybrid drive controller 50 is adapted to execute an operation mode determining sub-routine illustrated in the flow chart of FIG. 6, for selecting one of nine operation modes of the hybrid drive system 10 indicated in FIG. 7, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above. The engine torque $T_E$ can be obtained from the opening angle $\theta_{AC}$ of the throttle valve as detected by the throttle sensor 68, or from the amount of fuel injection into the engine 12. The motor torque $T_M$ can be obtained from the electric current of the motor/generator 14 as detected by the motor ammeter 65. An amount of electric energy SOC stored in the electric energy storage device 58 can be obtained from the electric current or charging efficiency of the motor/generator 14 when it is operated as the electric generator to charge the storage device 58.

The operation mode determining sub-routine of FIG. 6 is initiated with step S1 to determine whether there exists a command requiring the engine 12 to be started for driving the vehicle with the engine 12 used as the drive power source or for operating the motor/generator 14 for charging the electric energy storage device 58. If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 7, and the motor/generator 14 is operated to start the engine 12 through the planetary gear device 16, with the fuel injection amount and other conditions of the engine 10 being suitably controlled. When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14. Thus, even when the vehicle is running, the engine 12 can be started in the operation mode 9 by temporarily placing the automatic transmission 18 in the neutral position. The operation mode 9 eliminates an exclusive starter such as an electric motor provided for the sole purpose of starting the engine, and is therefore effective to reduce the required number of components of the hybrid drive system 10, leading to an accordingly reduced cost of manufacture thereof. It will be understood that a portion of the hybrid drive controller 50 assigned to implement step S2 constitutes ninth operation mode control means for controlling the hybrid drive system 10 in a ninth operation mode which is the operation mode 9 described above.

If a negative decision (NO) is obtained in step S1, that is, if no command requiring the starting of the engine 12 is present, the control flow goes to step S3 to determine whether brake application to the vehicle is required. This determination may be effected by determining whether a braking system of the vehicle is activated (whether the brake pedal has been depressed) or not, or whether an engine braking is required or not, or whether the operation amount $\theta_{AC}$ of the accelerator pedal during running of the vehicle is zero. The determination as to whether the engine braking is required may be effected by determining whether the currently selected position of the shift lever 40 is one of the engine braking positions "L" and "2" in which an engine brake or regenerative braking is generally applied, while at the same time the operation amount $\theta_{AC}$ of the accelerator pedal is zero. If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 7, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 14 is placed in the NON-LOAD state and permitted to rotate freely in the operation mode 8, the electric energy storage device 58 is protected from excessive charging and resulting deterioration of its charging and discharging efficiencies. It will be understood that a portion of the hybrid drive controller 50 assigned to implement step S5 constitutes eighth operation mode control means for controlling the hybrid drive system 10 in an eighth operation mode which is the operation mode 8 described above.

In the operation mode 6 selected in step S6, the first clutch CE1 is released (turned OFF) and the second clutch CE2 is engaged (turned ON), while the engine 12 is turned OFF, and the motor/generator 14 is placed in the CHARGING state, as indicated in the table of FIG. 7, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running. Since the engine 12 is disconnected from the planetary gear device 16 with the first clutch CE1 placed in the released state, the energy loss of the vehicle due to the drag resistance of the engine 12 is prevented in the operation mode 6. Further, since the operation mode 6 is selected when the stored electric energy amount SOC is smaller than the upper limit B, the electric energy storage device 58 is protected from excessive charging and resulting deterioration of its charging and discharging efficiencies. It will be understood that a portion of the hybrid drive controller 50 assigned to implement step S6 constitutes sixth operation mode control means for controlling the hybrid drive system 10 in a sixth operation mode which is the operation mode 6 described above.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 12 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary. If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 7, whereby the vehicle is started by the engine 12, with the regenerative braking torque of the motor/generator 14 being suitably controlled. Described in detail, the ratios of the engine torque $T_E$, output torque of the planetary gear device 16 and motor torque $T_M$ are 1:(1+ρE):ρE, where ρE represents a gear ratio of the planetary gear device 16 (ρ=number of teeth of the sun gear 16s divided by number of teeth of the ring gear 16r). When the gear ratio ρE is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16. In other words, the vehicle is started with a torque as large as (1+ρE)/ρE times the torque of the motor/generator 14. IF the motor/generator 14 is held in the NON-LOAD state with no current applied to the motor, the output of the carrier 16c is zeroed with the rotor shaft 14r merely rotating in the reverse direction, whereby the vehicle is held stationary. In this case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is (1+ρ) times the engine torque $T_E$. It will be understood that a portion of the hybrid drive controller 50 assigned to implement step S9 constitutes fifth operation mode control means for controlling the hybrid drive system 10 in a fifth operation mode which is the operation mode 5 described above.

The motor/generator 14 used in the hybrid drive system 10 of the present embodiment has a torque capacity which is about ρE times the maximum torque of the engine 12. Namely, the torque capacity and size of the motor/generator 14 are minimized to minimize the size and cost of manufacture of the hybrid drive system 10, while assuring the required torque. The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 7. In this operation mode 7, the output of the carrier 16c is zeroed with the rotor shaft 14r of the motor/generator 14 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5. It will be understood that a portion of the hybrid drive controller 50 assigned to implement step S10 constitutes seventh drive mode control means for controlling the hybrid drive system 10 in a seventh operation mode which is the operation mode 7 described above.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 10 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$ or the currently established operating position of the automatic transmission 18. The accelerator operation amount $\theta_{AC}$ per se may be used as the currently required output Pd. The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12). If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control-flow goes to step S13 to select an operation mode 1. If a negative decision (NO) is obtained in step S12, the control flow goes to step S14 to select an operation mode 3. The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator is operated so as to provide the currently required output Pd, as indicated in the table of FIG. 7, so that the vehicle is driven with only the motor/generator 14 used as the drive power source. In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted. It will be understood that a portion of the hybrid drive controller 50 assigned to implement step S13 constitutes first operation mode control means for controlling the hybrid drive system 10 in a first operation mode which is the operation mode 1 described above.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 7, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 58. It will be understood that a portion of the hybrid drive controller 50 assigned to implement step S14 constitutes third operation mode control means for controlling the hybrid drive system 10 in a third operation mode which is the operation mode 3 described above.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2. This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12). If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above. If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 17, whereby the vehicle is driven with only the engine 12 used as the drive power source. It will be understood that a portion of the hybrid drive controller 50 assigned to implement step S17 constitutes second operation mode control means for controlling the hybrid drive system 10 in a second operation mode which is the operation mode 2 described above.

In the operation mode 4 selected in step S19, the first and second clutches CE1, CE2 are both engaged (turned ON), and the engine 12 and the motor/generator 14 are both operated, as indicated in the table of FIG. 17, whereby the vehicle is driven with both the engine 12 and the motor/generator 14 used as the drive power sources. It will be understood that a portion of the hybrid drive controller 50 assigned to implement step S19 constitutes fourth operation mode control means for controlling the hybrid drive system 10 in a fourth operation mode which is the operation mode 4 described above. In this operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2. When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emissions can be made smaller in the operation mode 2 than in the operation mode 1. In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

In the hybrid drive system 10 according to the present embodiment described above, the engine 12 is connected to the ring gear 16r of the planetary gear device 16 through the first clutch CE1, and the second clutch CE2 is disposed between the sun gear 16s and a series connection of the first clutch CE1 and the carrier 16c. In this arrangement, the motor/generator 14 performs various functions depending upon the operating states of the first and second clutches CE1, CE2, that is, depending upon whether these clutches CE1, CE2 are engaged or released. Accordingly, the hybrid drive system 10 can be operated in the nine different operation modes 1–9 listed in the table of FIG. 7, depending upon the specific running condition of the vehicle. For instance, the first clutch CE1 is placed in the released state (OFF state) in the operation mode 1 (MOTOR DRIVE mode) or in the operation mode 6 (REGENERATIVE BRAKING mode), so that the engine 12 is disconnected from the planetary gear device 16, and the energy loss due to a drag resistance of the engine 12 is prevented, assuring improved energy efficiency of the hybrid drive system 10.

In the present hybrid drive system 10, the single motor/generator 14 serves as a sole drive power source in the operation mode 1 (MOTOR DRIVE mode), as an auxiliary drive power source in addition to the engine 12 in the operation mode 4 (ENGINE·MOTOR DRIVE mode), as an electric generator for charging the electric energy storage device 58 in the operation mode 3 (ENGINE DRIVE+ CHARGE mode), and as an electric generator for applying a regenerative braking force to the vehicle in the operation mode 6 9REGENERATIVE BRAKING mode). Thus, the present hybrid drive system 10 does not require a separate electric generator for charging the storage device 58 and for applying a regenerative brake, in addition to an electric motor for driving the vehicle, and is accordingly simplified in construction and available at a reduced cost.

The hybrid drive controller 50 is also adapted to execute a rear-drive mode control routine illustrated in the flow chart of FIG. 8, when the vehicle is driven in the rearward direction with the motor/generator 14 or the engine 12 used as the drive power source, with the shift lever 40 placed in the reverse position "R" and with the automatic transmission 18 placed in the first or second rear-drive position "Rev 1" or "Rev 2". The motor/generator 14 or the engine 12 is selected as the drive power source, depending upon the electric energy amount SOC stored in the storage device 58. The routine of FIG. 8 is initiated with step R1 to determine whether the shift lever 40 is placed in the reverse position "R". The currently selected position of the shift lever 40 is detected by the shift position sensor 74. If an affirmative decision (YES) is obtained in step R1, the control flow goes to step R2 to determine whether the stored electric energy amount SOC is equal to or larger than the predetermined lower limit A. If an affirmative decision (YES) is obtained in step R2, the control flow goes to step R3 in which the hybrid drive controller 50 commands the automatic transmission controller 52 to select or maintain the low-gear position (direct drive position) of the auxiliary transmission 20, for placing or holding the automatic transmission 18 in the first rear-drive position "Rev 1". Step R3 is followed by step R4 to calculate the currently required output Pd on the basis of suitable parameters such as the operating amount $\theta_{AC}$ of the accelerator pedal and the speed ratio of the first rear-drive position "Rev 1". Then, step R4 is implemented to operate the motor/generator 14 so as to provide the calculated currently required output Pd, that is, to operate the hybrid drive system 10 in the operation mode 1 (MOTOR DRIVE mode) discussed above. In this case, the engine 12 may be kept ON, with the first clutch CE1 held in the released state.

If a negative decision (NO) is obtained in step R2, that is, if the stored electric energy amount SOC is smaller than the lower limit A, the control flow goes to step R6 in which the hybrid drive controller 50 commands the automatic transmission controller 52 to select or maintain the high-gear position of the auxiliary transmission 20. Step R6 is followed by step R7 to calculate the currently required output Pd on the basis of suitable parameters such as the speed ratio of the second rear-drive position "Rev 2". Then, step R8 is implemented to operate the engine 12 so as to provide an output not smaller than the calculated currently required output Pd, that is, to operate the hybrid drive system 10 in the operation mode 2 (ENGINE DRIVE mode) or operation mode 3 (ENGINE DRIVE+CHARGE mode) discussed above. In step R6, the automatic transmission controller 52 deenergizes the solenoid of the solenoid-operated valve SL4, for releasing the clutch C0 and engaging the brake B0 so as to place the auxiliary transmission 20 in the high-gear position, whereby the automatic transmission 18 is placed in the second rear-drive position "Rev 2" having a higher speed ratio than the first rear-drive position "Rev 1".

It will be understood that a portion of the hybrid drive controller 50 assigned to implement step R2 constitutes energy amount determining means for determining whether the electric energy SOC stored in the electric energy storage device 58 is smaller than a predetermined lower limit, while a portion of the hybrid drive controller 50 assigned to implement steps R5 and R8 constitutes rear-drive mode control means operable when manually operated selecting means in the form of the shift lever 40 is shifted to the reverse position "R", for operating the motor/generator 14 as the drive power source to drive the motor vehicle in the rearward direction if the stored electric energy amount SOC is not smaller than the predetermined lower limit, and operating the engine 12 as the drive power source to drive the motor vehicle in the rearward direction if the stored electric energy amount SOC is smaller than the lower limit. It will also be understood that a portion of the hybrid drive controller 50 assigned to implement steps R3 and R6 and the automatic transmission controller 52 cooperate to constitute shift control means for shifting a power transmission device in the form of the automatic transmission 18 to a first rear-drive position if the stored electric energy amount SOC is not smaller than the lower limit, and for shifting the power transmission device to a second rear-drive position having a higher speed ratio than the first rear-drive position, if the stored electric energy amount SOC is smaller than the lower limit. It will further be understood that the shift control means cooperates with the manual shift valve 42 and the solenoid-operated valve SL4 to constitute rear-drive shifting means for shifting the power transmission device to a rear-drive position when the manually operated shifting means is shifted to the reverse position "R".

In the present hybrid drive system 10, the automatic transmission 18 is shifted to the first or second rear-drive position "Rev 1" or "Rev 2" when the shift lever 40 is operated to the reverse position "R". In this arrangement, the operating direction of the motor/generator 14 for driving the vehicle in the rearward direction is the same as that for driving the vehicle in the forward direction. In other words, the present hybrid drive system 10 eliminates a need of operating the motor/generator 14 in the reverse direction for driving the vehicle in the rearward direction, and makes it possible to simplify the control of the motor/generator 14. Further, the drive power source for driving the vehicle in the rearward direction is switched from the motor/generator 14 to the engine 12 when the electric energy amount SOC stored in the storage device 58 is reduced below the predetermined lower limit A, so that the storage device 58 is protected against excessive energy consumption and resulting deterioration of the life expectancy and charging and discharging efficiencies.

In the present hybrid drive system 10, the automatic transmission 18 has the first and second rear-drive positions "Rev 1" and "Rev 2" having different speed ratios. Described more specifically, when the vehicle is driven in the rearward direction by the engine 12, the automatic transmission 18 is placed in the second rear-drive position "Rev 2" having the higher speed ratio than the first rear-drive position "Rev 1", so that the drive torque is sufficiently reduced when the throttle valve is placed in a position close the engine idling position. Therefore, the present arrangement assures comparatively easy control of the vehicle during the rearward running with the engine. Further, the switching of the drive power source from the motor/generator 14 to the engine 14 for the rearward running of the vehicle can be effected easily, rapidly and smoothly, since the direction of rotation of the input and output shafts 26, 19 of the automatic transmission 18 is not reversed upon switching of the drive power source for the rearward running.

The automatic transmission 18 is adapted such that the first or second rear-drive position "Rev 1" or "Rev 2" is selectively established by the manual shift valve 42 mechanically linked with the shift lever 40, whereby the transmission 18 can be shifted to the appropriate rear-drive position even in the event of electrical malfunctioning of the associated sensors and solenoid-operated valves such as the solenoid-operated valve SL4.

In the present hybrid drive system 10, the auxiliary transmission 20 is disposed between the engine 12 (electrically operated torque converter 24) and the primary transmission 22, so that the torque to be transmitted to the primary transmission 22 is reduced during the rearward running with the transmission 18 placed in the second rear-drive position "Rev 2". This arrangement makes it possible to reduce the required torque transmitting capacities of the clutch C2 and brake B4 and the required diameter of the shafts in the primary transmission 22.

While the presently preferred embodiment of the present invention has been described in detail by reference to FIGS. 1–8, the present invention may be otherwise embodied.

Figure 9:
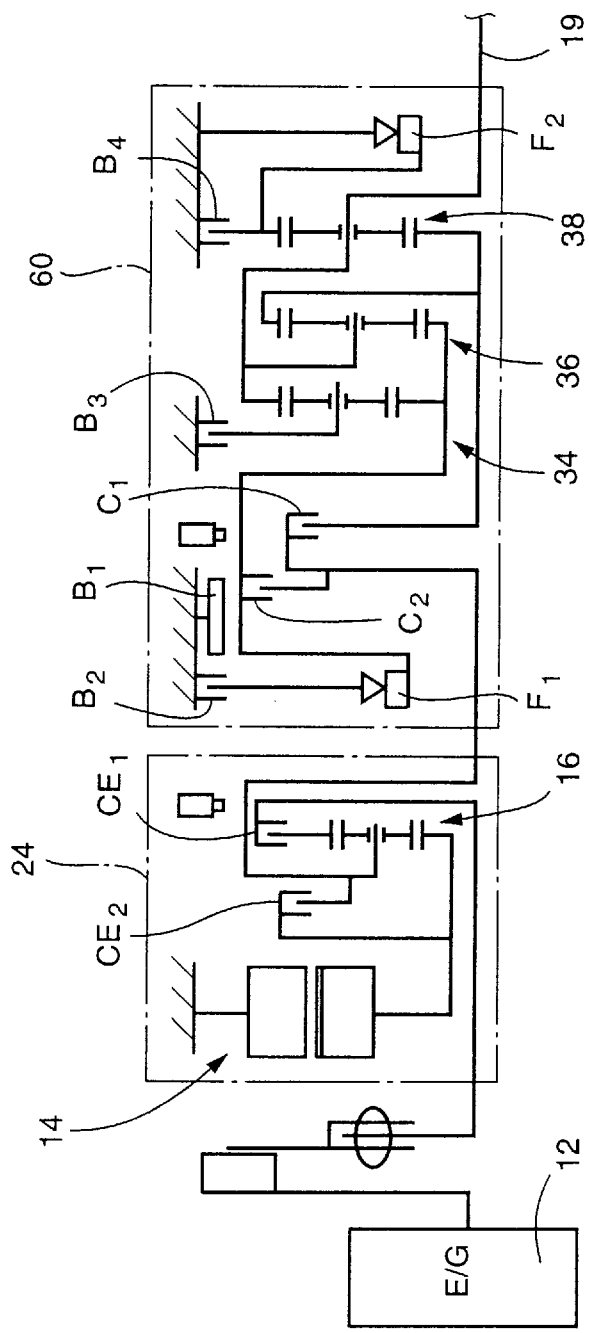
FIG. 9 is a schematic view showing a hybrid drive system according to another embodiment of this invention.

For instance, the automatic transmission 18 having the first and second rear-drive positions "Rev 1" and "Rev 2" provided in the illustrated embodiment may be replaced by an automatic transmission 60 which does not have the auxiliary transmission 20 and consists solely of the primary transmission 22, as shown in FIG. 9. In this case, the automatic transmission 60 has four forward-drive positions and one rear-drive position, as indicated in FIG. 10.

While the hybrid drive system 10 uses the power transmission device in the form of the automatic transmission 18 of planetary gear type, the gear arrangement of the planetary gear sets may be suitably changed. Further, the power transmission device may be any other types such as a parallel two-axes type.

Although the shift lever 40 is used in the illustrated embodiment as the manually operated shifting means for selecting the reverse position "R", any other types of manually operated shifting means such as a pushbutton switch may be used in place of the shift lever 40.

In the illustrated embodiments, when the shift lever 40 is operated to the reverse position "R", the electric motor 14 is operated to drive the motor vehicle in the rearward direction, if the amount of the electric energy stored in the electric energy storage device 58 is not smaller than the lower limit, but the engine 12 is operated to drive the motor vehicle in the rearward direction if the amount of the stored electric energy is smaller than the lower limit. However, the selective use of the electric motor 14 and the engine 12 to drive the vehicle in the rearward direction may depend upon other operating or running conditions of the vehicle. For instance, the electric motor is operated to drive the vehicle in the rearward direction if the ambient temperature is lower than a predetermined threshold, and the engine is operated to drive the vehicle in the rearward direction if the ambient temperature is not lower than the threshold. In this respect, it is noted that the engine is desirably used as the drive power source when the ambient temperature is relatively low, because the output characteristics of the electric motor at such a low temperature are not satisfactory to drive the vehicle, and because the heat generated by the engine is desirably used for heating the driver's and passengers' compartments of the vehicle when the ambient temperature is relatively low.

It is to be understood that the present invention may be embodied with various other changes, modifications and improvements, which may occur to those skilled in the art, without departing from the spirit and scope of the invention defined in the following claims:

What is claimed is:

1. A hybrid drive system for a motor vehicle having a drive wheel, comprising:

an engine operated by combustion of a fuel;

an electric energy storage device for storing an electric energy;

an electric motor operated with the electric energy stored in said electric energy storage device;

a power transmission device having at least one forward-drive position for driving said motor vehicle in a forward direction and at least one rear-drive position for driving said motor vehicle in a rearward direction, and disposed in a power transmission path between said drive wheel and a drive power source consisting of said engine and said electric motor;

manually operated selecting means for selecting said at least one rear-drive position of said power transmission device;

rear-drive shifting means for placing said power transmission device in one of said at least one rear-drive position when said manually operated selecting means is operated to a reverse position for selecting said at least one rear-drive position;

energy determining means for determining whether an amount of the electric energy stored in said electric energy storage device is smaller than a predetermined lower limit; and rear-drive mode control means, operable when said manually operated selecting means is operated to said reverse position, for operating said electric motor to drive said motor vehicle in said rearward direction if the amount of said electric energy stored in said electric energy storage device is not smaller than said lower limit, and for operating said engine to drive said motor vehicle in said rearward direction if the amount of said electric energy stored in said storage device is smaller than said lower limit.

2. A hybrid drive system according to claim 1, wherein said power transmission device includes an automatic transmission having a first and a second rear-drive position as said at least one rear-drive position, said second rear-drive position having a higher speed ratio than said first rear-drive position, said automatic transmission comprising rear-drive switching hydraulic actuators for selectively establishing said first and second rear-drive positions, and wherein said rear-drive shifting means comprises:

a solenoid-operated valve for controlling said rear-drive switching hydraulic actuators to selectively establish said first and second rear-drive positions of said automatic transmission; and shift control means for controlling said solenoid-operated valve so as to shift said automatic transmission to said first rear-drive position if the amount of the electric energy stored in said storage device is not smaller than said lower limit, and so as to shift said automatic transmission to said second rear-drive position if the amount of the electric energy stored in said storage device is smaller than said lower limit.

3. A hybrid drive system according to claim 1, wherein said power transmission device includes an automatic transmission having a first and a second rear-drive position as said at least one rear-drive position, said second rear-drive position having a higher speed ratio than said first rear-drive position, said automatic transmission comprising rear-drive selecting hydraulic actuators and rear-drive switching hydraulic actuators for selectively establishing said first and second rear-drive positions, and wherein said rear-drive shifting means comprises:

a manual shift valve mechanically connected to said manually operated selecting means means, for controlling said rear-drive selecting hydraulic actuators to establish said first and second rear-drive positions when said manually operated selecting means is operated to said reverse position;

a solenoid-operated valve for controlling said rear-drive switching hydraulic actuators to selecting one of said first and second rear-drive positions of said automatic transmission; and shift control means for controlling said solenoid-operated valve so as to shift said automatic transmission to said first rear-drive position if the amount of said electric energy stored in said storage device is not smaller than said lower limit, and so as to shift said automatic transmission to said second rear-drive position if the amount of the electric energy stored in said storage device is smaller than said lower limit.

4. A hybrid drive system according to claim 3, wherein said manually operated selecting means includes a shift lever mechanically connected to said manual shift valve.

5. A hybrid drive system according to claim 2, wherein said power transmission device includes an automatic transmission consisting of an auxiliary transmission having a low-gear position and a high-gear position having a higher speed ration than said low-gear position, and a primary transmission having a plurality of forward-drive positions and one rear-drive position, said rear-drive mode control means controlling said solenoid-operated valve so as to shift said auxiliary transmission to said low-gear position for thereby shifting said automatic transmission in said first rear-drive position if the amount of the electric energy stored in said storage device is not smaller than said lower limit, and so as to shift said auxiliary transmission to said high-gear position for thereby shifting said automatic transmission in said second rear-drive position if the amount of the electric energy stored in said storage device is smaller than said lower limit.

6. A hybrid drive system according to claim 3, wherein said power transmission device includes an automatic transmission consisting of an auxiliary transmission having a low-gear position and a high-gear position having a higher speed ration than said low-gear position, and a primary transmission having a plurality of forward-drive positions and one rear-drive position, said manual shift valve controlling said rear-drive selecting hydraulic actuators to establish said rear-drive position of said primary transmission when said manually operated selecting means is operated to said reverse position, and said rear-drive mode control means controlling said solenoid-operated valve so as to shift said auxiliary transmission to said low-gear position for thereby shifting said automatic transmission in said first rear-drive position if the amount of the electric energy stored in said storage device is not smaller than said lower limit, and so as to shift said auxiliary transmission to said high-gear position for thereby shifting said automatic transmission in said second rear-drive position if the amount of the electric energy stored in said storage device is smaller than said lower limit.

7. A hybrid drive system according to claim 1, wherein said power transmission device includes an automatic transmission having a plurality of forward-drive positions and one rear-drive position.

8. A hybrid drive system according to claim 1, wherein a motor/generator is connected to said electric energy storage device, said motor/generator being capable of operating selectively as said electric motor and an electric generator for charging said electric energy storage device.

9. A hybrid drive system according to claim 1, further comprising:
   a first clutch;
   a synthesizing/distributing mechanism including a first rotary element connected to said engine through said first clutch, a second rotary element connected to said motor/generator, a third rotary element, and an output member connected to said third rotary member; and
   a second clutch for connecting two elements of said first, second and third rotary elements of said synthesizing/distributing mechanism, for rotation of said two elements as a unit.

10. A hybrid drive system according to claim 9, wherein said motor/generator functions as said electric motor for driving said motor vehicle, an electric generator operated by said engine to charge said electric energy storage device, an electric generator operated with a kinetic energy of said motor vehicle to charge said electric energy storage device and apply regenerative brake to the motor vehicle, and an auxiliary drive power source assisting said engine during running of the vehicle with said engine.

11. A hybrid drive system for a motor vehicle, comprising:
   an engine operated by combustion of a fuel;
   an electric energy storage device for storing an electric energy;
   an electric motor operated with the electric energy stored in said electric energy storage device;
   a power transmission device having at least one forward-drive position for driving said motor vehicle in a forward direction and at least one rear-drive position for driving said motor vehicle in a rearward direction, and disposed in a power transmission path between said drive wheel and a drive power source consisting of said engine and said electric motor;
   manually operated selecting means for selecting said at least one rear-drive position of said power transmission device;
   rear-drive shifting means for placing said power transmission device in one of said at least one rear-drive position when said manually operated selecting means is operated to a reverse position for selecting said at least one rear-drive position; and
   rear-drive mode control means, operable when said manually operated selecting means is operated to said reverse position, for selectively operating said motor and said engine, depending upon a running condition of said motor vehicle.

12. A hybrid drive system according to claim 11, further comprising energy determining means for determining whether an amount of the electric energy stored in said electric energy storage device is smaller than a predetermined lower limit, and wherein said rear-drive mode control means operates said electric motor to drive said motor vehicle in said rearward direction if the amount of said electric energy stored in said electric energy storage device is not smaller than said lower limit, and operates said engine to drive said motor vehicle in said rearward direction if the amount of said electric energy stored in said storage device is smaller than said lower limit.

13. A hybrid drive system according to claim 11, wherein said power transmission device comprises a primary transmission including:
   an input member;
   an output member;
   a housing; and
   a first, a second and a third single pinion type planetary gear set which are accommodated in said housing, said first planetary gear set including (a-1) a first brake, (b-1) a first one-way clutch, (c-1) a second brake connected to in series with said first one-way clutch, (d-1) a second clutch, (e-1) a first sun gear which is selectively fixed to said housing through said first brake and selective connected to said housing through a series connection of said one-way clutch and said second brake, and selectively connected to said input member through said second clutch, (f-1) a third brake, (g-1) a first carrier selectively fixed to said housing through said third brake, and (h-1) a first ring gear connected to said output member, said second planetary gear set including (a-2) a second sun gear connected to said first sun gear, (b-2) a second carrier connected to said output member, and (c-2) a second ring gear selectively connected to said input member through said first clutch, said third planetary gear set including (a-3) a third sun gear connected to said second ring gear, (b-3) a third carrier connected to said output member, (c-3) a fourth brake, (d-3) a second one-way clutch, and (e-3) a third ring gear selectively fixed to said housing through said fourth brake and selectively connected to said housing through said second one-way clutch, and wherein said primary transmission has a rear-drive position which is established when said first, second and third brakes are released, and when said fourth brake and said second clutch are engaged.

14. A hybrid drive system according to claim 13, wherein said power transmission device includes an automatic transmission having a first and a second rear-drive position as said at least one rear-drive position, said second rear-drive position having a higher speed ratio than said first rear-drive position, said automatic transmission comprising rear-drive switching hydraulic actuators for selectively establishing said first and second rear-drive positions, and wherein said rear-drive shifting means comprises:

a solenoid-operated valve for controlling said rear-drive switching hydraulic actuators to selectively establish said first and second rear-drive positions of said automatic transmission; and shift control means for controlling said solenoid-operated valve so as to shift said automatic transmission to said first rear-drive position if the amount of the electric energy stored in said storage device is not smaller than said lower limit, and so as to shift said automatic transmission to said second rear-drive position if the amount of the electric energy stored in said storage device is smaller than said lower limit.

* * * * *